United States Patent
Cao et al.

(10) Patent No.: US 12,470,722 B2
(45) Date of Patent: Nov. 11, 2025

(54) IMAGE ENCODING METHOD, REAL-TIME COMMUNICATION METHOD, DEVICE, STORAGE MEDIUM, AND PROGRAM PRODUCT

(71) Applicant: Tencent Technology (Shenzhen) Company Limited, Guangdong (CN)

(72) Inventors: Jian Cao, Shenzhen (CN); Hongbin Cao, Shenzhen (CN); Xiaoxiang Yang, Shenzhen (CN); Sijia Chen, Shenzhen (CN); Yongcheng Huang, Shenzhen (CN); Jia Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 67 days.

(21) Appl. No.: 18/334,441

(22) Filed: Jun. 14, 2023

(65) Prior Publication Data

US 2023/0328259 A1 Oct. 12, 2023

Related U.S. Application Data

(63) Continuation of application No. PCT/CN2022/135614, filed on Nov. 30, 2022.

(30) Foreign Application Priority Data

Jan. 27, 2022 (CN) .......... 202210103019.3

(51) Int. Cl.
*H04N 19/159* (2014.01)
*H04N 19/172* (2014.01)
*H04N 19/184* (2014.01)

(52) U.S. Cl.
CPC ......... *H04N 19/159* (2014.11); *H04N 19/172* (2014.11); *H04N 19/184* (2014.11)

(58) Field of Classification Search
CPC ........ G16B 20/30; G16B 20/50; G16B 25/10; C12N 2320/12; H04N 19/172;
(Continued)

(56) References Cited

U.S. PATENT DOCUMENTS 9,788,077 B1 10/2017 Shen et al.
2007/0002953 A1* 1/2007 Kusunoki .......... H04N 21/2368
375/E7.199

(Continued)

FOREIGN PATENT DOCUMENTS

| CN | 102630013 A | 8/2012 |
|---|---|---|
| CN | 111970510 A | 11/2020 |
| CN | 113766226 A | 12/2021 |

OTHER PUBLICATIONS

Xiong Rong, "A H.264 code rate control algorithm and its application and research in scene changing", University of Electronic Science and Technology of China, Master Dissertation, Mar. 15, 2011, 69 pages.

(Continued)

*Primary Examiner* — Md N Haque
(74) *Attorney, Agent, or Firm* — Sughrue Mion, PLLC

(57) ABSTRACT

An image encoding method and apparatus, a real-time communication method, a device, a storage medium, and a program product. The method includes: obtaining a first image frame in a video stream, encoding the first image frame into a first non-instantaneous decoding refresh (non-IDR) frame, and encoding a next image frame of the first image frame into an instantaneous decoding refresh (IDR) frame based on a determination, according to the first non-IDR frame, that a scene switch occurs.

18 Claims, 9 Drawing Sheets

(58) Field of Classification Search
CPC .. H04N 19/159; H04N 19/142; H04N 19/107; H04N 19/179
See application file for complete search history.

(56) References Cited

U.S. PATENT DOCUMENTS

| | | |
|---|---|---|
| 2010/0054329 A1 | 3/2010 | Bronstein et al. |
| 2010/0241920 A1* | 9/2010 | Nonogaki ............ H04N 19/895 |
| | | 714/752 |
| 2014/0301437 A1* | 10/2014 | Wang ................... H04N 19/107 |
| | | 375/240.02 |
| 2020/0413099 A1* | 12/2020 | Su ........................ H04N 19/132 |
| 2021/0120061 A1* | 4/2021 | Labrozzi ............ H04N 21/8456 |
| 2021/0266564 A1* | 8/2021 | Hayashi ............... H04N 23/695 |

OTHER PUBLICATIONS

International Search Report for PCT/CN2022/135614 dated Jan. 20, 2023.
Written Opinion for PCT/CN2022/135614 dated Jan. 20, 2023.

* cited by examiner

IMAGE ENCODING METHOD, REAL-TIME COMMUNICATION METHOD, DEVICE, STORAGE MEDIUM, AND PROGRAM PRODUCT

CROSS-REFERENCE TO RELATED APPLICATION(S)

This application is a continuation application of International Application No. PCT/CN2022/135614, filed on Nov. 30, 2022, which claims priority to Chinese Patent Application No. 202210103019.3 filed with the China National Intellectual Property Administration on Jan. 27, 2022, the disclosures of which are incorporated by reference herein in their entireties.

FIELD

The disclosure relates to the field of image processing technologies, and in particular, to an image encoding method, a real-time communication method, a device, a storage medium, and a program product.

BACKGROUND

Video or image processing based on a cloud scenario is relatively common. The process may be roughly as follows: A cloud server generates a video, acquires a video image, and encodes the acquired video image to obtain a bitstream of the video image. The cloud server may transmit the bitstream to a terminal device, and the terminal device decodes the bitstream and finally displays the video image according to a decoding result.

There may be a scene switch in the video. An image frame in this case generally relies more on pixels in the frame, so that such an image frame is encoded through intra prediction. In other words, for the scene switch, the cloud server may encode the image frame in this case into an instantaneous decoding refresh (IDR) frame, which is because the IDR frame merely adopts intra prediction.

In a related art, before encoding each image frame, the cloud server calculates a similarity between the image frame and a previous image frame of the image frame. The image frame is encoded into an IDR frame if the similarity is greater than a preset threshold. In other words, there is a pre-processing process before each image frame is encoded. However, because an encoding speed of an encoder of the cloud server is generally fast, the pre-processing process may take much more time than the encoding process, causing a relatively large latency of the entire image processing process. Such a large latency reduces user experience, especially in the cloud scenario with a high real-time requirement.

SUMMARY

Embodiments of the disclosure provide an image encoding method, a real-time communication method, an electronic device, a computer-readable storage medium, and a computer program product.

Some embodiments provide an image encoding method, performed by a computer device, including: obtaining a first image frame in a video stream; encoding the first image frame into a first non-instantaneous decoding refresh (non-IDR) frame; and encoding a next image frame of the first image frame into an instantaneous decoding refresh (IDR) frame based on a determination, according to the first non-IDR frame, that a scene switch occurs.

Some embodiments provide a real-time communication method, performed by a computer device, including: obtaining user operation information from a terminal device; generating a video stream in real time according to the user operation information; obtaining a first image frame in the video stream; encoding the first image frame into a first non-instantaneous decoding refresh (non-IDR) frame; encoding a next image frame of the first image frame into an instantaneous decoding refresh (IDR) frame based on a determination, according to the first non-IDR frame, that a scene switch occurs, to obtain an encoded bitstream corresponding to the next image frame; and transmitting the encoded bitstream corresponding to the next image frame to the terminal device.

Some embodiments provide an image encoding apparatus, including: at least one memory configured to store program code; and at least one processor configured to read the program code and operate as instructed by the program code, the program code including: obtaining code configured to cause the at least one processor to obtain a first image frame in a video stream; and encoding code configured to cause the at least one processor to encode the first image frame into a first non-IDR frame, and encode a next image frame of the first image frame into an IDR frame based on it is determined according to the first non-IDR frame that a scene switch occurs.

Some embodiments provide a real-time communication apparatus, including at least one memory configured to store program code; and at least one processor configured to read the program code and operate as instructed by the program code, the program code including processing code and communication code. The communication code is configured to cause the at least one processor to obtain user operation information transmitted by a terminal device. The processing code is configured to cause the at least one processor to generate a video stream in real time according to the user operation information, obtain a first image frame in the video stream, encode a next image frame of the first image frame into an IDR frame in a case that it is determined according to the first non-IDR frame that a scene switch occurs, to obtain an encoded bitstream corresponding to the next image frame. The communication code is further configured to cause the at least one processor to transmit the encoded bitstream corresponding to the next image frame to the terminal device.

Some embodiments provide an electronic device, including a processor and a memory, where the memory is configured to store a computer program, and the processor is configured to call and run the computer program stored in the memory to implement the method provided in some embodiments.

Some embodiments provide a computer-readable storage medium, storing computer code that when executed by at least one processor causes the at least one processor to execute the method provided in some embodiments.

Some embodiments provide a computer program product, including computer program instructions, where when the computer program instructions are executed by a processor, the method provided in some embodiments is implemented.

Some embodiments provide a computer program, where when the computer program is executed by a processor, the method provided in some embodiments is implemented.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
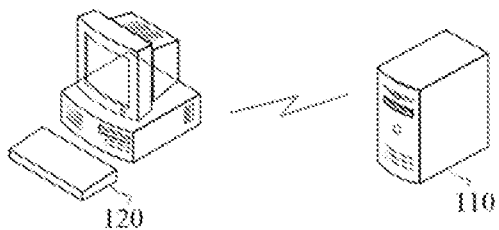
FIG. 1 is a schematic diagram of a cloud gaming scenario according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In some embodiments, after the first image frame is encoded into the first non-IDR frame, determination on an inter-frame scene switch is performed, to determine whether the scene switch occurs, and in a case that it is determined that the scene switch occurs, the next image frame is encoded into the IDR frame. Compared with the solution in the related art in which a pre-processing process is performed before each image frame is encoded, a pre-processing process is not required in some embodiments, and instead, whether the scene switch occurs is determined in the encoding process. If the scene switch occurs, the next image frame is encoded into the IDR frame. This can reduce a latency of the entire image processing process, and improve encoding efficiency of the image frames. Especially in a cloud scenario with a high real-time requirement, because an image processing latency is reduced, user experience can be improved.

The terms such as "first" and "second" are intended to distinguish between similar objects but do not necessarily indicate a specific order or sequence. It is to be understood that the data termed in such a way are interchangeable in appropriate circumstances, so that the embodiments described herein can be implemented in orders other than the order illustrated or described herein. Moreover, the terms "comprise", "include", and any other variants thereof mean to cover the non-exclusive inclusion. For example, a process, method, system, product, or server that includes a list of operations or units is not necessarily limited to those operations or units that are clearly listed, but may include other operations or units not expressly listed or inherent to such a process, method, product, or device.

The terms in some embodiments are applicable to the following descriptions.

Video encoding: It is a method for converting a file in an original video format into a file in another video format through a compression technology, where converted data may be referred to as a bitstream.

Video decoding: It is a reverse process of video encoding.

Intra prediction: It is to predict current pixels by using encoded pixels in a same image frame, without referring to another encoded image frame.

Inter prediction: It is to predict current pixels by using pixels in another encoded image frame. In other words, another encoded image frame is required for reference.

IDR frame: It is a type of encoded frame defined in a video encoding technology. An IDR frame is encoded merely through intra prediction, and a decoder can decode content of the IDR frame independently without information about another frame. An IDR frame is generally used as a reference frame of a subsequent frame, and an entry point for bitstream switching.

P frame: It is a forward prediction encoded frame, which is predicted from a previous encoded frame. An encoder compares same information or data between the current P frame and the previous encoded frame, in some embodiments, considers motion characteristics, to perform an inter-frame compression.

B frame: It is a bidirectional prediction interpolation encoded frame. When encoding an image frame into a B frame, an encoder compresses the original frame according to a difference among data of a previous frame adjacent to the B frame, the original frame, and a subsequent frame. In other words, only the difference between the original frame and the previous and subsequent frames is recorded.

In some cases, a P frame may include intra prediction pixels and inter prediction pixels. Similarly, a B frame may also include intra prediction pixels and inter prediction pixels.

Non-IDR frame: Any encoded frame except an IDR frame can be referred to as a non-IDR frame. The non-IDR frame may be a P frame or a B frame, but is not limited thereto.

In some cloud scenarios with a high real-time requirement, such as a cloud gaming scenario, an encoded frame is generally an IDR frame or a P frame. In other words, a non-IDR frame in this case refers to a P frame.

Some embodiments provide an image encoding method, a real-time communication method, an electronic device, a computer-readable storage medium, and a computer program product. An image frame does not need to be pre-processed. Considering a fast encoding speed of an encoder, whether a scene switch occurs is determined in an encoding process. A next image frame is encoded into an IDR frame in a case that the scene switch occurs.

It is to be understood that some embodiments can be applied to a cloud gaming scenario, but are not limited thereto:

Cloud gaming, also referred to as gaming on demand, is an online gaming technology based on a cloud computing technology. The cloud gaming technology enables a thin client with relatively limited image processing and data computing capabilities to run a high-quality game. In the cloud gaming scenario, a game is run on a cloud server, rather than a player game terminal. The cloud server renders a game scene into a video and audio stream which is transmitted to the player game terminal through a network. The player game terminal does not need to have powerful image computing and data process capabilities, and only needs a basic streaming media playback capability and a capability to obtain instructions inputted by a player and to transmit the instructions to the cloud server.

FIG. 1 is a schematic diagram of a cloud gaming scenario according to some embodiments. As shown in FIG. 1, a cloud server 110 (that is, a computer device) may communicate with a player game terminal 120. The cloud server 110 may run a game, acquire a video image of the game, and encode the acquired video image to obtain a bitstream of the video image. The cloud server may transmit the bitstream to a terminal device, and the terminal device decodes the bitstream and finally displays the video image according to a decoding result.

In some embodiments, the cloud server 110 may communicate with the player game terminal 120 through a long term evolution (LTE) technology, a new radio (NR) technology, a Wireless Fidelity (WI-FI) technology, and the like, but the technologies are not limited thereto.

In the cloud gaming scenario, a cloud server refers to a server that runs a game on the cloud and has functions such as video enhancement (pre-encoding processing) and video encoding, but is not limited thereto.

A terminal device refers to a type of device with rich human-machine interaction manners, a capability to access the Internet, generally equipped with various operating systems, and a relatively strong processing capability. A terminal device may be a smartphone, a living room television, a wearable device, a virtual reality (VR) device, a tablet computer, an in-vehicle terminal, a player game terminal such as a handheld game console, or the like, but is not limited thereto.

Figure 2:
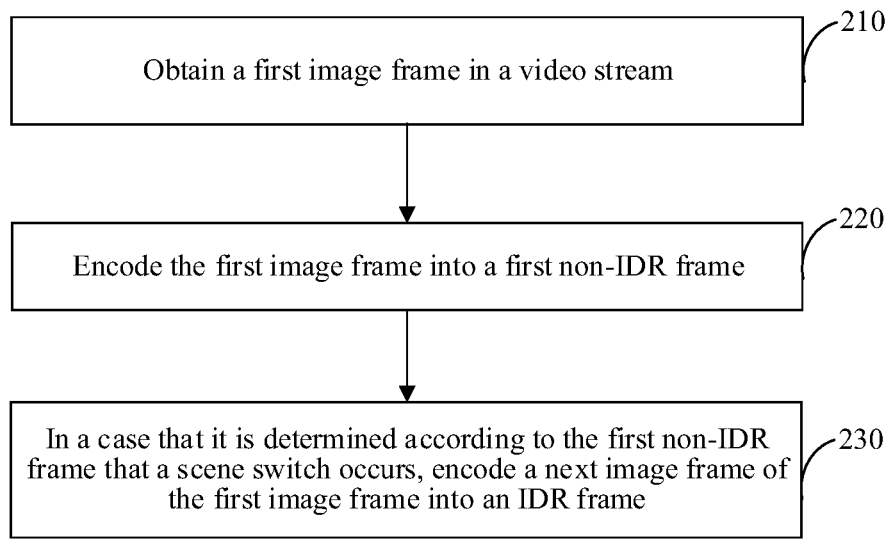
FIG. 2 is a flowchart of an image encoding method according to some embodiments.

FIG. 2 is a flowchart of an image encoding method according to some embodiments. The method may be performed by a cloud server. For example, in a cloud gaming scenario, the cloud server may be the cloud server 110 in FIG. 1. An execution body of the image encoding method is not limited thereto. As shown in FIG. 2, the method includes the following operations:

S210: Obtain a first image frame in a video stream.

S220: Encode the first image frame into a first non-IDR frame.

S230: Encode a next image frame of the first image frame into an IDR frame in a case that it is determined according to the first non-IDR frame that a scene switch occurs.

It is to be understood that, without considering the scene switch, the first image frame in a video is generally encoded into an IDR frame, and subsequent image frames are encoded into non-IDR frames. In other words, a video is encoded as follows: an IDR frame, a non-IDR frame, a non-IDR frame, and so on.

In a case of considering the scene switch, it can be learned according to the foregoing operation S230 that the next image frame has been encoded into an IDR frame. In some embodiments, other than the image frame that is the first and that is encoded into an IDR frame, there is another IDR frame obtained through encoding due to the scene switch. In this case, the first image frame refers to any image frame except an image frame that is the first and an encoded image frame in the video stream, where the encoded image frame is an image frame that is determined to be encoded into the IDR frame.

In some embodiments, in a real-time communication scenario, the video stream is generated in real time. For example, in a cloud gaming scenario, once the cloud server obtains user operation information, in some embodiments, the user operation information indicates an operation performed by a user on the cloud gaming, such as operations performed by the user on a joystick or a button. In this case, the cloud server can generate the video stream based on the user operation information.

In some embodiments, the operations performed by the user on the joystick or the button include up, down, left, and right operations on the joystick or the button. The up, down, left, and right operations are used for controlling movement of a virtual object displayed by a terminal, or controlling the virtual object to perform corresponding operations, but are not limited thereto.

In some embodiments, there may be a correspondence between the user operation information and video data. In some embodiments, there is a correspondence between a control operation performed by the user for the game and a game scene. For example, the user presses a button, which indicates that a game character controlled by the user needs to pick up a virtual gun. In this case, the game character picking up the gun corresponds to corresponding video data. The cloud server can obtain the video data and renders the video data into the video stream in real time based on the correspondence.

It is to be understood that the video stream may be a cloud gaming video of a cloud gaming scenario, a livestreaming video of an interactive live streaming, or a video of a video conference or a video call, and this is not limited thereto.

For example, for a video stream, it is assumed that the cloud server encodes an image frame that is the first into an IDR frame, and an image frame that is the second into a non-IDR frame. However, it is determined according to the non-IDR frame that there is a scene switch. In this case, an image frame that is the third may be encoded into an IDR frame. The foregoing first image frame may be the image frame that is the second herein.

An encoding manner of the cloud server is not limited thereto.

After the cloud server encodes the first image frame into a first non-IDR frame, the following implementations may be used to determine whether the scene switch occurs.

In some embodiments, the cloud server may determine an intra prediction pixel ratio of the first non-IDR frame; determine, according to the intra prediction pixel ratio of the first non-IDR frame, whether the scene switch occurs, but is not limited thereto:

Implementation 1: In a case that the intra prediction pixel ratio of the first non-IDR frame is greater than a preset threshold, it is determined that the scene switch occurs; and in a case that the intra prediction pixel ratio of the first non-IDR frame is less than or equal to the preset threshold, it is determined that the scene switch does not occur. Alternatively, in a case that the intra prediction pixel ratio of the first non-IDR frame is greater than or equal to the preset threshold, it is determined that the scene switch occurs; and in a case that the intra prediction pixel ratio of the first non-IDR frame is less than the preset threshold, it is determined that the scene switch does not occur.

It is to be understood that, for the case of the scene switch, pixels in an image frame during the scene switch are greatly different from pixels in a previous image frame. Therefore, in this case, although the cloud server encodes the image frame during the scene switch into a non-IDR frame, most pixels in the non-IDR frame adopt intra prediction. Based on this, in a case that an intra prediction pixel ratio of a non-IDR frame is greater than the preset threshold, it is determined that the scene switch occurs. Alternatively, in a case that the intra prediction pixel ratio of the non-IDR frame is greater than or equal to the preset threshold, it is determined that the scene switch occurs.

It is to be understood that the intra prediction pixel ratio refers to a ratio of intra prediction pixels to all pixels in the first non-IDR frame. The intra prediction pixels refer to the pixels that adopt intra prediction.

For example, assuming that there are 100 pixels in the first non-IDR frame, and there are 80 intra prediction pixels, the intra prediction pixel ratio of the first non-IDR frame is 80/100=80%.

In some embodiments, the preset threshold may be negotiated between the cloud server and the terminal device, may be pre-defined, or may be specified by the cloud server or the terminal device. This is not limited thereto.

In some embodiments, a value of the preset threshold may be 60%, 70%, 80%, 90%, and the like, and this is not limited thereto.

Implementation 2: In a case that an inter prediction pixel ratio of the first non-IDR frame is less than the preset threshold, it is determined that the scene switch occurs; and in a case that the inter prediction pixel ratio of the first non-IDR frame is greater than or equal to the preset threshold, it is determined that the scene switch does not occur. Alternatively, in a case that the inter prediction pixel ratio of the first non-IDR frame is less than or equal to the preset threshold, it is determined that the scene switch occurs; and in a case that the inter prediction pixel ratio of the first non-IDR frame is greater than the preset threshold, it is determined that the scene switch does not occur.

It is to be understood that, for the case of the scene switch, pixels in an image frame during the scene switch are greatly different from pixels in a previous image frame. Therefore, in this case, although the cloud server encodes the image frame during the scene switch into a non-IDR frame, most pixels in the non-IDR frame adopt intra prediction, and few pixels adopt inter prediction. Based on this, in a case that an intra prediction pixel ratio of a non-IDR frame is less than the preset threshold, it is determined that the scene switch occurs. Alternatively, in a case that the inter prediction pixel ratio of the non-IDR frame is less than or equal to the preset threshold, it is determined that the scene switch occurs.

It is to be understood that the inter prediction pixel ratio refers to a ratio of inter prediction pixels to all pixels in the first non-IDR frame. The inter prediction pixels refer to the pixels that adopt inter prediction.

For example, assuming that there are 100 pixels in the first non-IDR frame, and there are 20 inter prediction pixels, the intra prediction pixel ratio of the first non-IDR frame is 20/100=20%.

In some embodiments, the preset threshold may be negotiated between the cloud server and the terminal device, may be pre-defined, or may be specified by the cloud server or the terminal device. This is not limited thereto.

In some embodiments, the value of the preset threshold may be 10%, 20%, 30%, 40%, and the like, and this is not limited thereto.

In some embodiments the next image frame of the first image frame is encoded into a non-IDR frame in a case that it is determined that the scene switch does not occur.

In some embodiments, the cloud server may obtain the first image frame, encode the first image frame into the first non-IDR frame, determine according to the first non-IDR frame whether the scene switch occurs, and encodes the next image frame of the first image frame into the IDR frame in a case that it is determined that the scene switch occurs. Because the encoding speed of the cloud server is fast, a pre-processing process is not required in some embodiments, and instead, whether the scene switch occurs is determined in the encoding process. The next image frame is encoded into the IDR frame in a case that the scene switch occurs. This can reduce a latency of the entire image processing process. Especially in a cloud scenario with a high real-time requirement, because an image processing latency is reduced, user experience can be improved.

Figure 3:
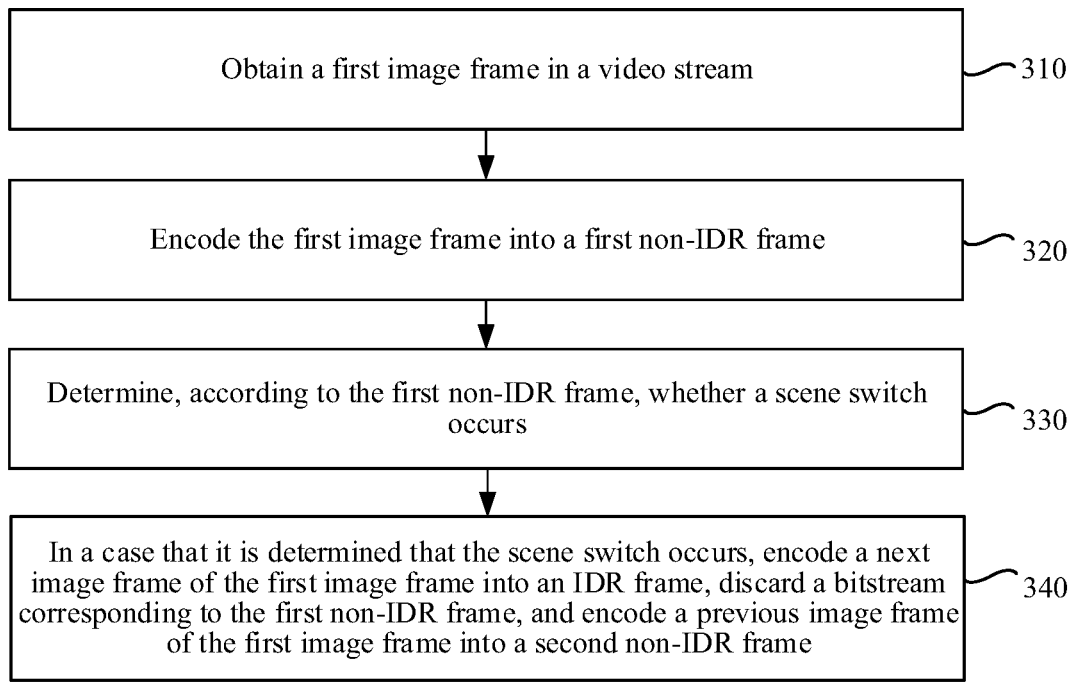
FIG. 3 is a flowchart of another image encoding method according to some embodiments.

FIG. 3 is a flowchart of another image encoding method according to some embodiments. The method may be performed by a cloud server. For example, in a cloud gaming scenario, the cloud server may be the cloud server 110 in FIG. 1. An execution body of the image encoding method is not limited thereto. As shown in FIG. 3, the method includes the following operations:

S310: Obtain a first image frame in a video stream.

S320: Encode the first image frame into a first non-IDR frame.

S330: Determine, according to the first non-IDR frame, whether a scene switch occurs.

S340: In a case that it is determined that the scene switch occurs, encode a next image frame of the first image frame into an IDR frame, discard a bitstream corresponding to the first non-IDR frame, and encode a previous image frame of the first image frame into a second non-IDR frame.

It is to be understood that, as can be learned from the foregoing method for determining whether the scene switch occurs, in a case that it is determined that the scene switch occurs, it indicates that most pixels in the first non-IDR frame adopt intra prediction, and few pixels adopt inter prediction. An encoder needs to allocate a higher bit rate for intra prediction pixels, and allocate a lower bit rate for inter prediction pixels. Based on this, the encoder needs to allocate a higher bit rate for the first non-IDR frame. However, when the encoding bit rate is fixed, in a case that a higher bit rate is allocated to the first non-IDR frame, a bit rate allocated to other subsequent image frames is lowered, reducing the overall video quality. Based on this, the cloud server may discard the bitstream corresponding to the first non-IDR frame, encode the previous image frame of the first image frame into the second non-IDR frame, to obtain a bitstream corresponding to the second non-IDR frame, to resolve the foregoing technical problem. This is because when a repeated frame, namely, the previous image frame is encoded again, because the two image frames are the same, the inter frame encoding manner can greatly lower the encoding bit rate. This enables the encoder to provide a higher bit rate to the other subsequent image frames in a case that the encoding bit rate is fixed, improving the overall video quality.

Figure 4:
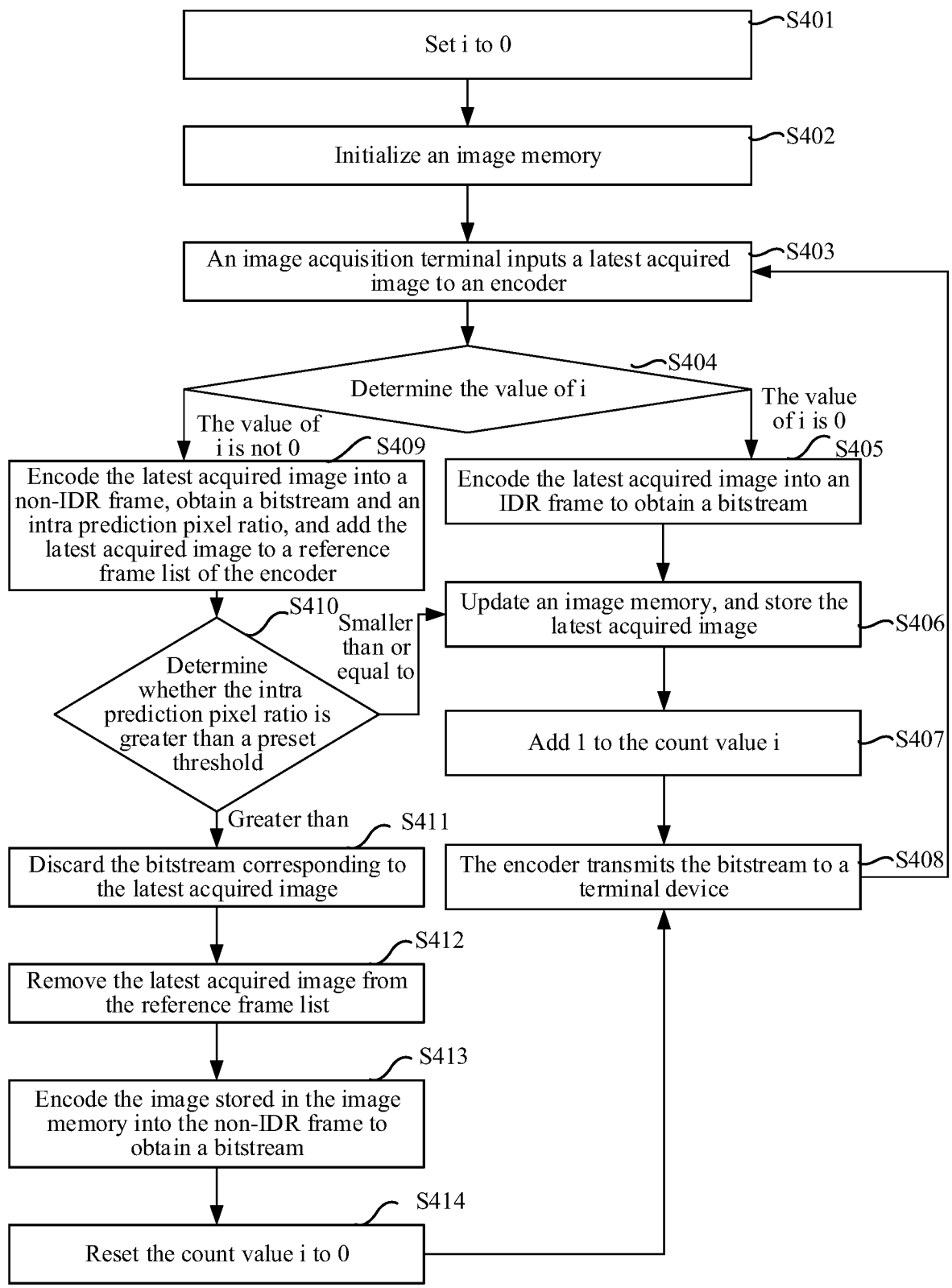
FIG. 4 is a flowchart of still another image encoding method according to some embodiments.

FIG. 4 is a flowchart of still another image encoding method according to some embodiments. The method includes the following operations:

S401: Set i to 0, where
i is a count value, and in an initialization phase of an encoder, i is set to 0.

S402: Initialize an image memory, where
a capacity of the image memory is a size of an image frame. S403 is entered after the encoder completes the initialization.

S403: An image acquisition terminal inputs a latest acquired image to the encoder.

S404: Determine the value of i, enter S405 when the value of i is 0, and enter S409 when the value of i is not 0.

S405: Encode the latest acquired image into an IDR frame to obtain a bitstream.

S406: Update the image memory, and store the latest acquired image.

S407: Add 1 to the count value i.

S408: The encoder transmits the bitstream to a terminal device, and S403 is entered.

S409: Encode the latest acquired image into a non-IDR frame, obtain the bitstream and an intra prediction pixel ratio, and add the latest acquired image to a reference frame list of the encoder.

S410: Determine whether the intra prediction pixel ratio is greater than a preset threshold. If the intra prediction pixel ratio is greater than the preset threshold, it is determined that a scene switch occurs, and S411 is entered; otherwise, S406 is entered.

S411: Discard the bitstream corresponding to the latest acquired image.

S412: Remove the latest acquired image from the reference frame list.

A subsequent frame does not refer to the image frame for predictive encoding.

S413: Encode the image stored in the image memory into the non-IDR frame to obtain a bitstream.

S414: Reset the count value i to 0, and enter S408.

For example, it is assumed that a video stream includes five image frames. According to the method procedure corresponding to FIG. 4, a cloud server first sets i to 0, and then initializes the image memory. It is assumed that the image acquisition terminal first acquires an image frame that is the first. In this case, the encoder may encode the image frame that is the first into an IDR frame to obtain a bitstream, input the bitstream to the terminal device, and store the first image frame into the image memory. In this case, i is set to i+1, in other words, i=1. If the image acquisition terminal acquires an image frame that is the second, because i=1, the encoder may encode the image frame that is the second into a non-IDR frame, obtain a bitstream and an intra prediction pixel ratio of the non-IDR frame, and add the image frame that is the second to the reference frame list of the encoder. If the intra prediction pixel ratio of the IDR frame is greater than the preset threshold, it is determined that the scene switch occurs. The bitstream corresponding to the image frame that is the second is then discarded, the image frame that is the second is removed from the reference frame list, the image frame that is the first stored in the image memory is encoded into a non-IDR frame, a bitstream is obtained, the bitstream is inputted into the terminal device, and the count value i is reset to 0. If the image acquisition terminal acquires an image frame that is the third, because i=0, the encoder may encode the image frame that is the third into an IDR frame to obtain a bitstream, input the bitstream to the terminal device, and store the third image frame into the image memory. In this case, i is set to i+1, in other words, i=1. If the image acquisition terminal acquires an image frame that is the fourth, because i=1, the encoder may encode the image frame that is the fourth into a non-IDR frame, obtain a bitstream and an intra prediction pixel ratio of the non-IDR frame, and add the image frame that is the fourth to the reference frame list of the encoder. If the intra prediction pixel ratio of the IDR frame is less than or equal to the preset threshold, it is determined that the scene switch does not occur. The image memory is then updated. In some embodiments, the image frame that is the third is updated to the image frame that is the fourth in the image memory. In addition, the bitstream corresponding to the image frame that is the fourth is inputted to the terminal device. In this case, i is set to i+1, in other words, i=2. If the image acquisition terminal acquires an image frame that is the fifth, because i=5, the encoder may encode the image frame that is the fifth into a non-IDR frame, obtain a bitstream and an intra prediction pixel ratio of the non-IDR frame, and add the image frame that is the fifth to the reference frame list of the encoder. If the intra prediction pixel ratio of the IDR frame is less than or equal to the preset threshold, it is determined that the scene switch does not occur. The image memory is then updated. In some embodiments, the image frame that is the fourth is updated to the image frame that is the fifth in the image memory. In addition, the bitstream corresponding to the image frame that is the fifth is inputted to the terminal device. In this case, i is set to i+1, in other words, i=3. In this case, the five image frames are traversed, and the process ends.

In some embodiments, if it is determined that the scene switch occurs, in addition to encoding the next image frame of the first image frame into the IDR frame, the bitstream corresponding to the first non-IDR frame is further discarded, and the previous image frame of the first image frame is encoded into the second non-IDR frame, to obtain the bitstream corresponding to the second non-IDR frame. By using the repeated frame encoding manner, because repeated frames are the same, the inter frame encoding manner can greatly lower the encoding bit rate. This enables the encoder to provide a higher bit rate to the other subsequent image frames in a case that the encoding bit rate is fixed, improving the overall video quality.

Some embodiments are not limited to inserting an IDR frame in a case of the scene switch, and may further combine a solution of inserting IDR frames regularly, to improve flexibility of inserting an IDR frame.

Figure 5:
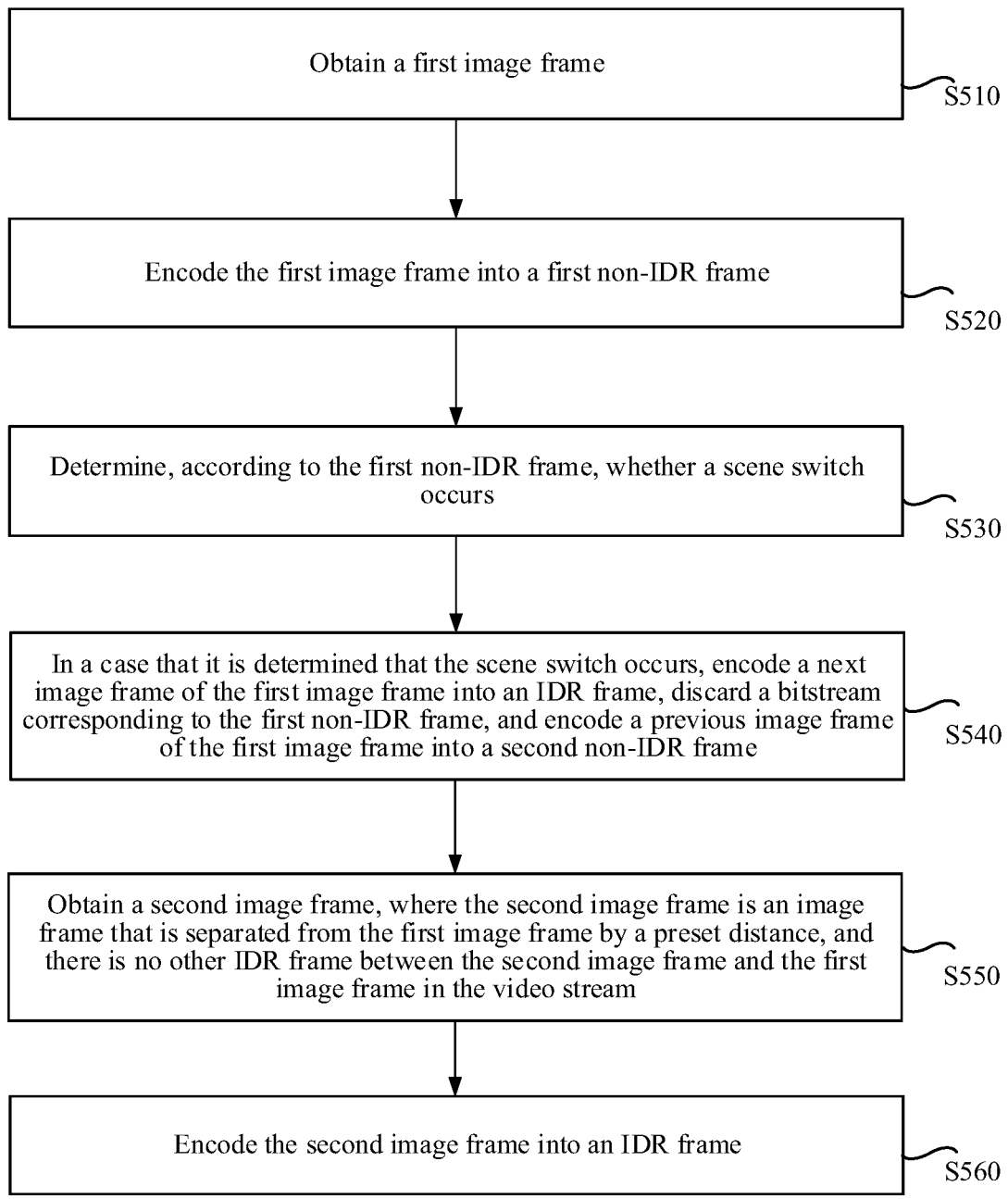
FIG. 5 is a flowchart of yet another image encoding method according to some embodiments.

FIG. 5 is a flowchart of another image encoding method according to some embodiments. The method may be performed by a cloud server. For example, in a cloud gaming scenario, the cloud server may be the cloud server 110 in FIG. 1. An execution body of the image encoding method is not limited thereto. As shown in FIG. 5, the method includes the following operations:

S510: Obtain a first image frame.

S520: Encode the first image frame into a first non-IDR frame.

S530: Determine, according to the first non-IDR frame, whether a scene switch occurs.

S540: In a case that it is determined that the scene switch occurs, encode a next image frame of the first image frame into an IDR frame, discard a bitstream corresponding to the first non-IDR frame, and encode a previous image frame of the first image frame into a second non-IDR frame.

S550: Obtain a second image frame, where the second image frame is an image frame that is separated from the first image frame by a preset distance, and there is no other IDR frame between the second image frame and the first image frame in the video stream.

S560: Encode the second image frame into an IDR frame.

It is to be understood that this embodiment is a combined example of the embodiment corresponding to FIG. 3 and the solution of inserting IDR frames regularly. In practice, the solution of inserting IDR frames regularly may alternatively be combined with the embodiment corresponding to FIG. 2, and this is not described again.

It is to be understood that the solution of inserting IDR frames regularly refers to inserting an IDR frame at an interval of a fixed quantity of image frames. For example, for a video stream, an encoder may encode the first frame, the eleventh frame, and the twenty-first frame into IDR frames. In other words, IDR frames are inserted at an interval of ten frames, and other frames are non-IDR frames.

It is to be understood that, the foregoing second image frame is an IDR frame inserted according to the solution of inserting an IDR frame regularly, and the IDR frame is a next IDR frame of the IDR frame corresponding to the first image frame. The preset distance is the interval of a fixed quantity of image frames at which an IDR frame is inserted.

For example, it is assumed that target image frames include 100 image frames, an image frame is inserted at an interval of 10 image frames, and it is determined according to a non-IDR frame corresponding to the eightieth image frame that a scene switch occurs. In this case, the eighty-first image frame may be encoded into an IDR frame, and the nighty-first image frame is to be encoded into an IDR frame according to the solution of inserting IDR frames regularly.

To sum up, embodiments are not limited to inserting an IDR frame in a case of the scene switch, and may further combine a solution of inserting IDR frames regularly, to improve flexibility of inserting an IDR frame.

Figure 6:
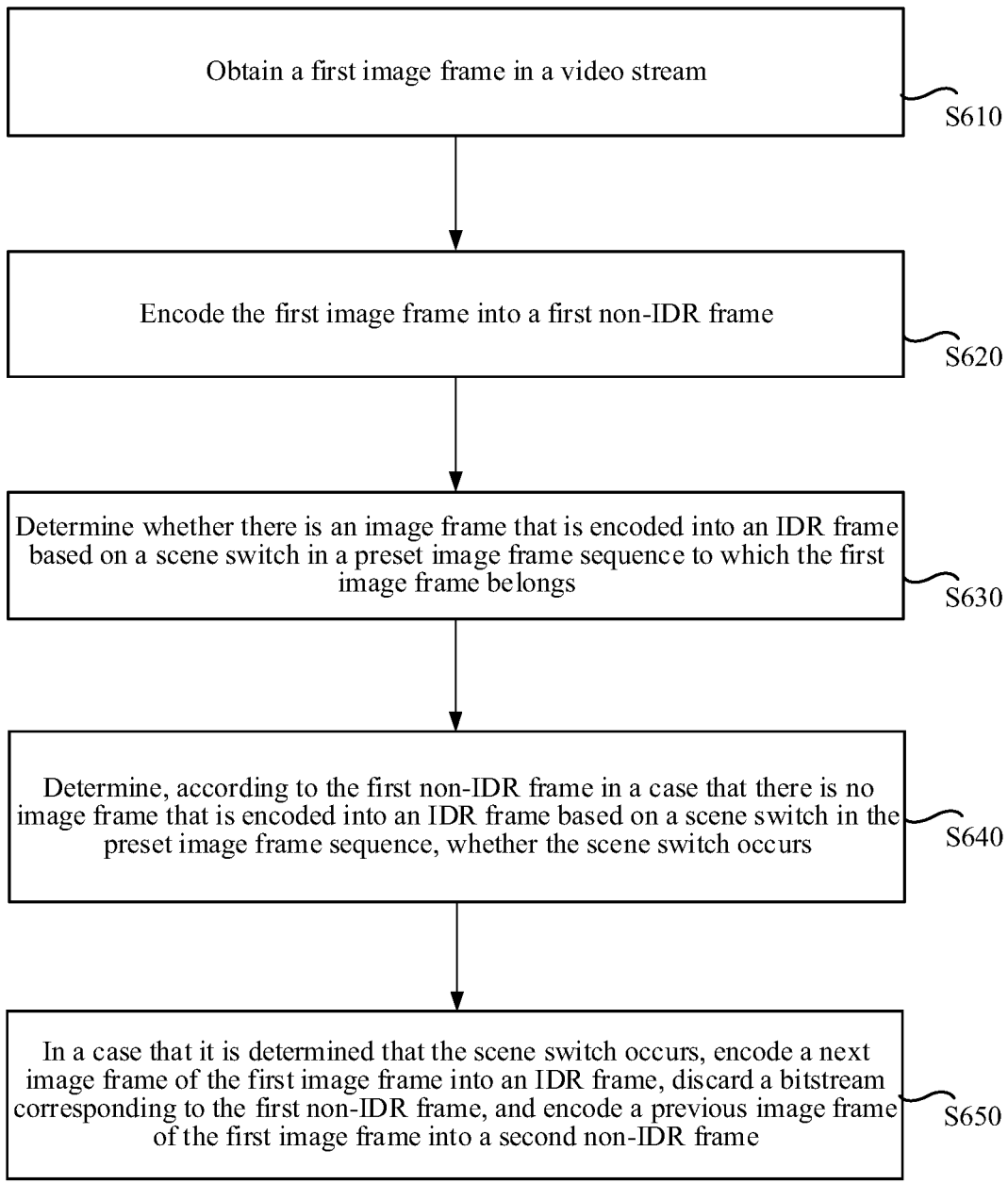
FIG. 6 is a flowchart of another image encoding method according to some embodiments.

FIG. 6 is a flowchart of another image encoding method according to some embodiments. The method may be performed by a cloud server. For example, in a cloud gaming scenario, the cloud server may be the cloud server 110 in FIG. 1. An execution body of the image encoding method is not limited thereto. As shown in FIG. 6, the method includes the following operations:

S610: Obtain a first image frame in a video stream.

S620: Encode the first image frame into a first non-IDR frame.

S630: Determine whether there is an image frame that is encoded into an IDR frame based on a scene switch in a preset image frame sequence to which the first image frame belongs.

S640: Determine, according to the first non-IDR frame in a case that there is no image frame that is encoded into an IDR frame based on a scene switch in the preset image frame sequence, whether the scene switch occurs.

S650: In a case that it is determined that the scene switch occurs, encode a next image frame of the first image frame into an IDR frame, discard a bitstream corresponding to the first non-IDR frame, and encode a previous image frame of the first image frame into a second non-IDR frame.

It is to be understood that this embodiment is an improved solution of the embodiment corresponding to FIG. 3. In practice, a similar improved solution may also be used in the embodiment corresponding to FIG. 2, and this is not described again herein.

In some embodiments, the preset image frame sequence to which the first image frame belongs may be negotiated between the cloud server and the terminal device, may be pre-defined, or may be specified by the cloud server or the terminal device. This is not limited thereto.

For example, it is assumed that the cloud server and the terminal device negotiate to determine whether the scene switch occurs once every ten image frames. The cloud server determines whether the scene switch occurs once for the first image frame to the tenth image frame, determines whether the scene switch occurs once for the eleventh image frame to the twentieth image frame, determines whether the scene switch occurs once for the twenty-first image frame to the thirtieth image frame, and the like. Based on this, for any one of the first image frame to the tenth image frame, the preset image frame sequence to which the image frame belongs is an image frame sequence formed by the first image frame to the tenth image frame. For any one of the eleventh image frame to the twentieth image frame, the preset image frame sequence to which the image frame belongs is an image frame sequence formed by the eleventh image frame to the twentieth image frame. For any one of the twenty-first image frame to the thirtieth image, the preset image frame sequence to which the image frame belongs is an image frame sequence formed by the twenty-first image frame to the thirtieth image frame.

Once there is a scene switch in the preset image frame sequence, determination on whether the scene switch occurs is not performed for the first non-IDR frame. Otherwise, once there is no scene switch in the preset image frame sequence, determination on whether the scene switch occurs is performed for the first non-IDR frame.

For example, it is assumed that the cloud server and the terminal device negotiate to determine whether the scene switch occurs once every ten image frames. For the first image frame to the tenth image frame, assuming that determination on whether the scene switch occurs is not performed for the first image frame, and determination on whether the scene switch occurs is performed for the second image frame, there is no need to determine whether the scene switch occurs for the third image frame to the tenth image frame.

According to the technical solutions provided in some embodiments, a frequency of inserting IDR frames can be reduced. An IDR frame generally corresponds to a high bit rate. The manner of reducing the frequency of inserting IDR frames can reduce the consumption of the bit rate, and improve the video quality.

Figure 7:
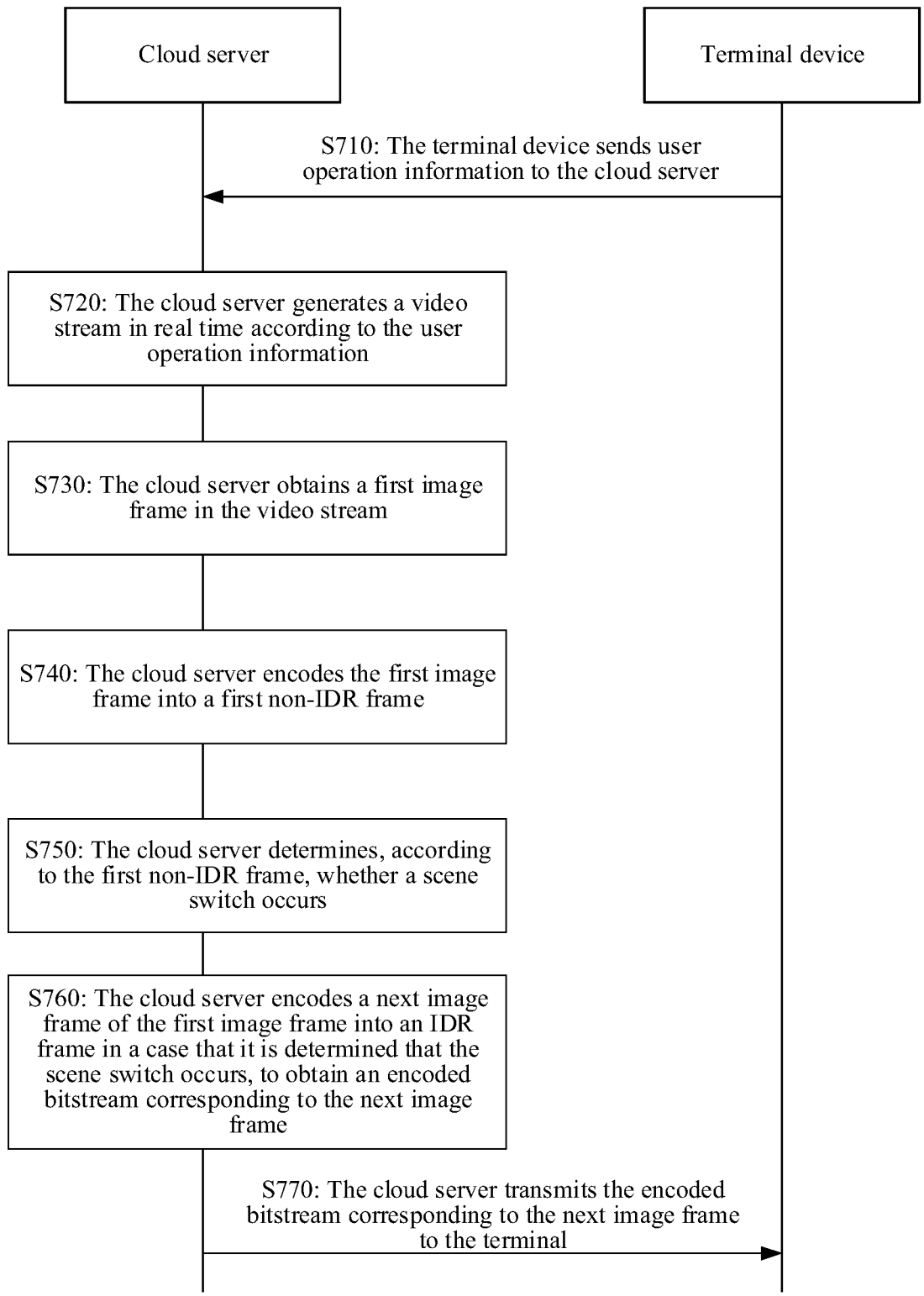
FIG. 7 is an interaction flowchart of a real-time communication method according to some embodiments.

FIG. 7 is an interaction flowchart of a real-time communication method according to some embodiments. The method may be performed by a remote server (also referred to as a cloud server) and a terminal device, and includes:

S710: The terminal device sends user operation information to the cloud server.

S720: The cloud server generates a video stream in real time according to the user operation information.

S730: The cloud server obtains a first image frame in the video stream.

S740: The cloud server encodes the first image frame into a first non-IDR frame.

S750: The cloud server determines, according to the first non-IDR frame, whether a scene switch occurs.

S760: The cloud server encodes a next image frame of the first image frame into an IDR frame in a case that it is determined that the scene switch occurs, to obtain an encoded bitstream corresponding to the next image frame.

S770: The cloud server transmits the encoded bitstream corresponding to the next image frame to the terminal device.

In some embodiments, in a real-time communication scenario, the video stream is generated in real time. For example, in a cloud gaming scenario, once the cloud server obtains user operation information, in some embodiments, the user operation information indicates an operation performed by a user on the cloud gaming, such as operations performed by the user on a joystick or a button. In this case, the cloud server can generate the video stream based on the user operation information.

In some embodiments, the operations performed by the user on the joystick or the button include up, down, left, and right operations on the joystick or the button. The up, down, left, and right operations are used for controlling movement of a virtual object displayed by a terminal, or controlling the virtual object to perform corresponding operations, but are not limited thereto.

In some embodiments, there may be a correspondence between the user operation information and video data. In some embodiments, there is a correspondence between a control operation performed by the user for the game and a game scene. For example, the user presses a button, which indicates that a game character controlled by the user needs to pick up a gun. In this case, the user picking up the gun corresponds to corresponding video data. The cloud server can obtain the video data and renders the video data into the video stream in real time based on the correspondence.

In some embodiments, in a case that it is determined that the scene switch occurs, the cloud server discards a bitstream corresponding to the first non-IDR frame; encodes a previous image frame of the first image frame into a second non-IDR frame, to obtain an encoded bitstream corresponding to the previous image frame; and transmits the encoded bitstream corresponding to the previous image frame to the terminal device.

In some embodiments, the cloud server determines, according to an intra prediction pixel ratio of the first non-IDR frame, whether the scene switch occurs.

Reference can be made to the above for how the cloud server determines according to the first non-IDR frame whether the scene switch occurs, and the encoding manner of repeated frames. The details are not repeated herein.

In some embodiments, the cloud server may further obtain a second image frame, and encode the second image frame into an IDR frame, where the second image frame is an image frame that is separated from the first image frame by a preset distance, and there is no other IDR frame between the second image frame and the first image frame in the video stream.

Reference can be made to the above for content of this implementation, and the details are not repeated below.

In some embodiments, before the cloud server determines according to the first non-IDR frame whether the scene switch occurs, the method further includes: determining whether there is an image frame that is encoded into an IDR frame based on a scene switch in a preset image frame sequence to which the first image frame belongs. Correspondingly, if there is no mage frame that is encoded into an IDR frame based on a scene switch in the preset image frame sequence, the cloud server may determine according to the first non-IDR frame whether the scene switch occurs.

Reference can be made to the above for content of this implementation, and the details are not repeated below.

According to the real-time communication method provided in some embodiments, an existing pre-processing process is not required, and instead, whether the scene switch occurs is determined in the encoding process. The next image frame is encoded into the IDR frame in a case that the scene switch occurs. This can reduce a latency of the entire image processing process, and further reduce a communication latency, to improve user experience.

Moreover, in the real-time communication method, an encoder end uses the repeated frame encoding manner. Because repeated frames are the same, the inter frame encoding manner can greatly lower the encoding bit rate. This enables the encoder to provide a higher bit rate to the other subsequent image frames in a case that the encoding bit rate is fixed, improving the overall video quality.

It is to be understood that in the cloud gaming scenario, the foregoing image encoding method has practical significance only when the decoder end, namely, the terminal device, has the capability to decode the bitstream of the video stream. A method for obtaining a target decoding configuration is provided below.

Figure 8:
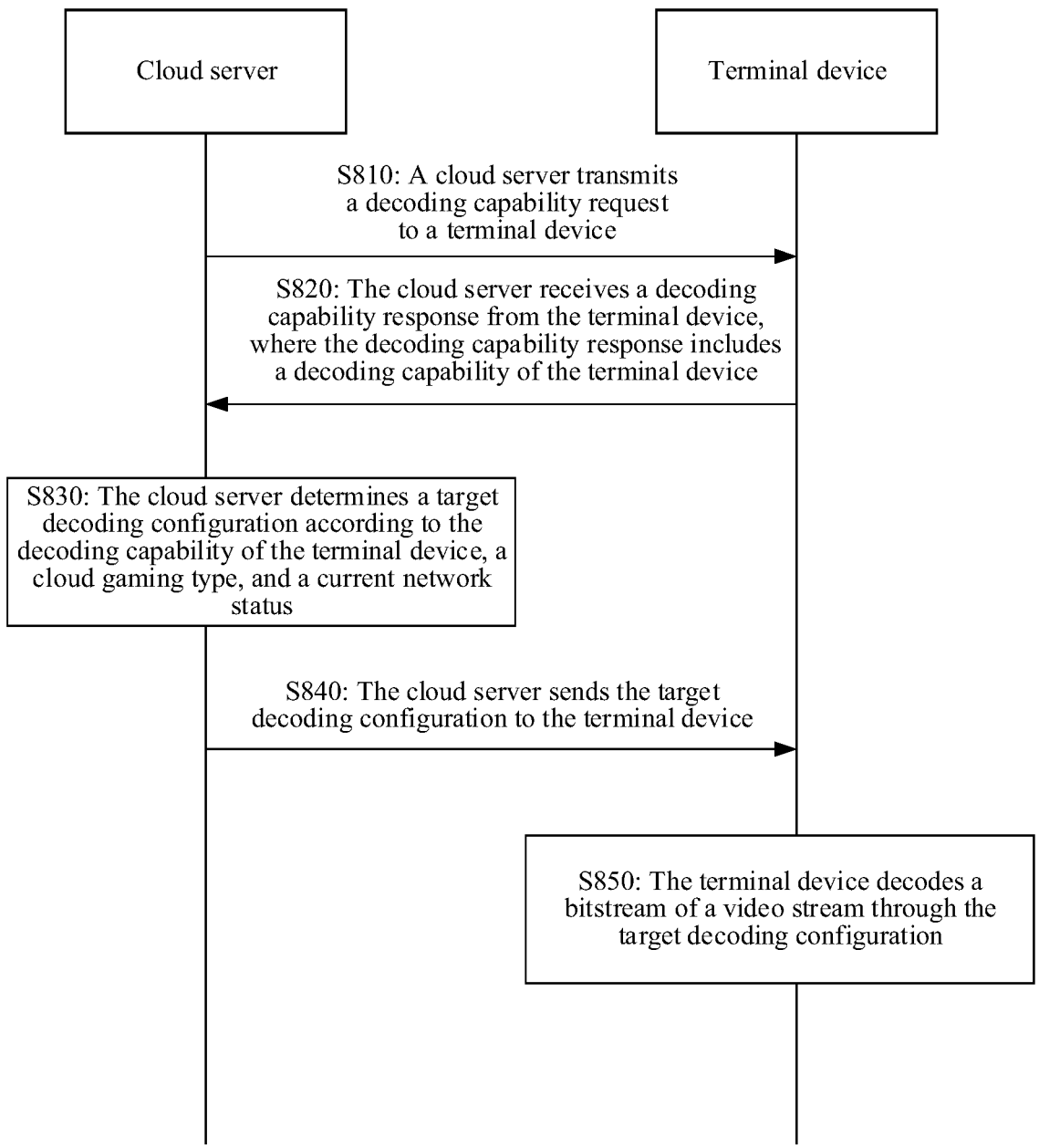
FIG. 8 is a flowchart of a method for obtaining a target decoding configuration according to some embodiments.

FIG. 8 is a flowchart of a method for obtaining a target decoding configuration according to some embodiments. As shown in FIG. 8, the method includes the following operations:

S810: A cloud server transmits a decoding capability request to a terminal device.

S820: The cloud server receives a decoding capability response from the terminal device, where the decoding capability response includes a decoding capability of the terminal device.

S830: The cloud server determines a target decoding configuration according to the decoding capability of the terminal device, a cloud gaming type, and a current network status.

S840: The cloud server sends the target decoding configuration to the terminal device.

S850: The terminal device decodes a bitstream of a video stream through the target decoding configuration.

Figure 9:
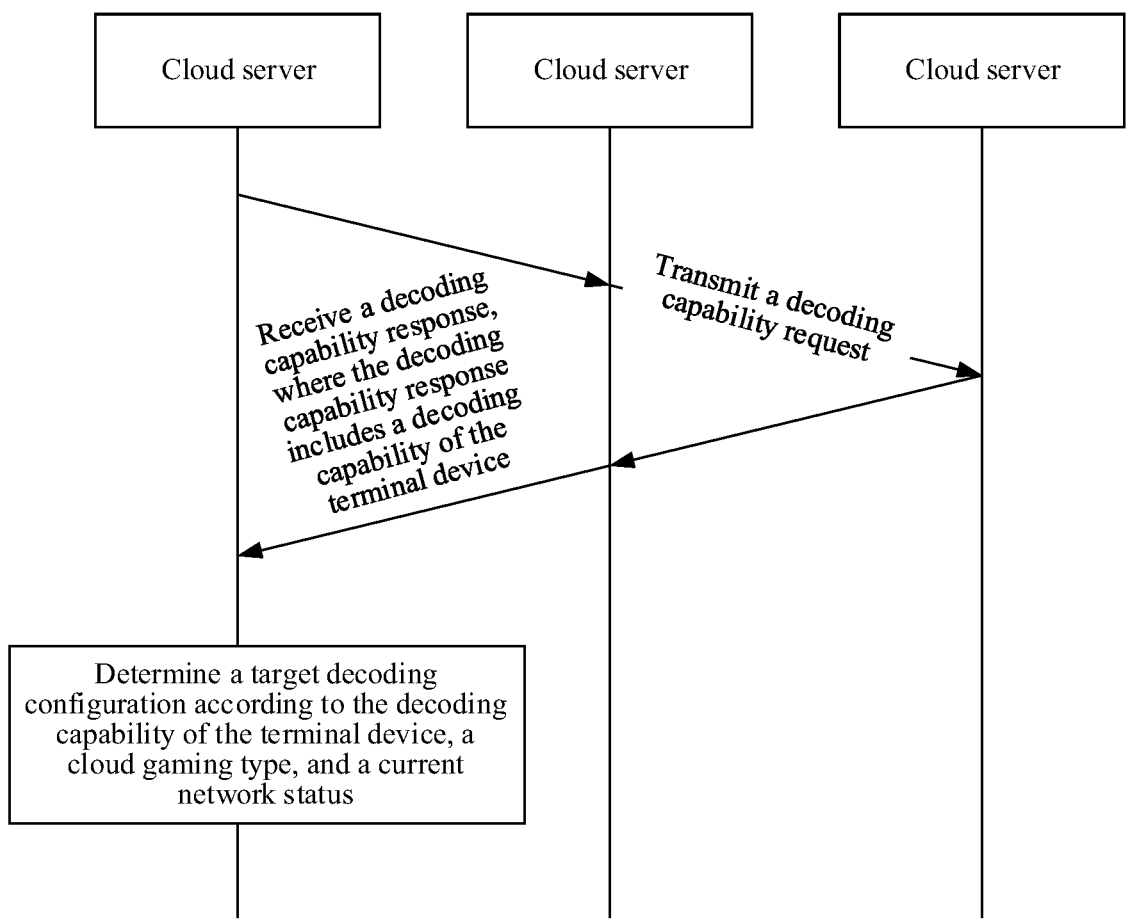
FIG. 9 is a flowchart of an encoding and decoding coordination method according to some embodiments.

The target decoding configuration may be an optimal decoding configuration. As shown in FIG. 9, the cloud server may transmit the decoding capability request to the terminal device through a client installed in the terminal device, and the terminal device may further return the decoding capability response to the cloud server through the client. Correspondingly, the cloud server receives the decoding capability response, where the decoding capability response includes the decoding capability of the terminal device; and determines the target decoding configuration (namely, the optimal decoding configuration) according to the decoding capability of the terminal device, the cloud gaming type, and the current network status. In a cloud gaming scenario, the client may be a cloud gaming client.

In some embodiments, the decoding capability request is used for requesting the decoding capability of the terminal device.

In some embodiments, the decoding capability request includes at least one of the following but is not limited to: a protocol version number and a decoding protocol query.

In some embodiments, the protocol version number refers to a minimum protocol version supported by the cloud server, and the protocol may be a decoding protocol.

In some embodiments, the decoding protocol query refers to a decoding protocol to be queried by the cloud server, and is, for example, a video decoding protocol H264 or H265.

For example, a code of the decoding capability request can be implemented as follows:
[codec_ability]; encoding and decoding capability
version=1.0; minimum protocol version supported by the cloud server
type=16, 17; query H264, H265 capability Reference may be made to Table 1 for descriptions of each data structure in the code, which are not described again herein.

Table 1 shows a data structure of the decoding capability of the terminal device:

TABLE 1

| Section | Type | Section description |
|---|---|---|
| [codec_ability] | — | Video coding and decoding capability |
| [codecN] | — | Video codec, N being 1, 2, 3, |

| Key | Type | Value description |
|---|---|---|
| codecs | Integer | Required. A quantity of hardware codec types supported by the device. When the quantity of hardware codecs is N, N Sections are followed immediately, respectively [codec1], [codec2], . . . , and [codecN], identifying information of the N codec types. |
| type | Enumerate | Encoding protocol type<br>0: undefined;<br>16: H264;<br>17: H265; |
| profiles | Integer | A quantity of profiles supported by the decoder. When there are N profiles supported by the decoder, N keys are followed immediately, respectively profile1, profile2, . . . , and profileN, identifying content of the N profiles. |
| profileN | String (two-tuple) | N is1, 2, 3, or the like. Represent profile and level tuple supported by the decoder. The first element is profile, and the second element is level, separated by a comma. If only the H264 decoding protocol of the terminal device supports profile = High, level = Level51, it is represented as profileN = 8, 32768 |
| performances | Integer | A quantity of performance metrics of the decoder. When the quantity of performance metrics of the decoder is N, N keys are followed immediately, respectively performance1, performance2, . . . , and profileN, identifying content of the N performances. |
| performanceN | String (three-tuple) | N is 1, 2, 3, or the like. Represent the performance data three-tuple supported by the terminal device. The first element is a video size. The second element is a video frame rate. The third element is a single-frame decoding latency in milliseconds. If the terminal device decodes 1080 p@60 fps at 5 ms, it is represented as performanceX = 8, 8, 5. |

Reference may be made to Table 2 for a definition of each decoding protocol:

TABLE 2

| Decoding protocol | Enumerate definition |
|---|---|
| H264 | 16 |
| H265 | 17 |
| AV1 | 48 |

Reference may be made to Table 3 for a definition of a profile supported by the terminal device in each decoding protocol:

TABLE 3

| Decoding protocol | Profile | Enumerate definition |
|---|---|---|
| H264 | Baseline | 0x01 |
| | Main | 0x02 |
| | Extended | 0x04 |
| | High | 0x08 |
| | High10 | 0x10 |
| | High422 | 0x20 |
| | High444 | 0x40 |
| | ConstrainedBaseline | 0x10000 |
| | ConstrainedHigh | 0x80000 |

TABLE 3-continued

| Decoding protocol | Profile | Enumerate definition |
|---|---|---|
| H265 | Main | 0x01 |
| | Main10 | 0x02 |
| | MainStill | 0x04 |
| | Main10HDR10 | 0x1000 |
| | Main10HDR10Plus | 0x2000 |
| AV1 | Main8 | 0x1 |
| | Main10 | 0x2 |
| | Main10HDR10 | 0x1000 |
| | Main10HDR10Plus | 0x2000 |

Reference may be made to Table 4 for a definition of a level supported by the terminal device in each decoding protocol:

TABLE 4

| Decoding protocol | Level | Enumerate definition |
|---|---|---|
| H264 | Level1 | 0x01 |
| | Level1b | 0x02 |
| | Level11 | 0x04 |
| | Level12 | 0x08 |
| | Level13 | 0x10 |
| | Level2 | 0x20 |

TABLE 4-continued

| Decoding protocol | Level | Enumerate definition |
|---|---|---|
| | Level21 | 0x40 |
| | Level22 | 0x80 |
| | Level3 | 0x100 |
| | Level31 | 0x200 |
| | Level32 | 0x400 |
| | Level4 | 0x800 |
| | Level41 | 0x1000 |
| | Level42 | 0x2000 |
| | Level5 | 0x4000 |
| | Level51 | 0x8000 |
| | Level52 | 0x10000 |
| | Level6 | 0x20000 |
| | Level61 | 0x40000 |
| | Level62 | 0x80000 |
| H265 | MainTierLevel1 | 0x1 |
| | HighTierLevel1 | 0x2 |
| | MainTierLevel2 | 0x4 |
| | HighTierLevel2 | 0x8 |
| | MainTierLevel21 | 0x10 |
| | HighTierLevel21 | 0x20 |
| | MainTierLevel3 | 0x40 |
| | HighTierLevel3 | 0x80 |
| | MainTierLevel31 | 0x100 |
| | HighTierLevel31 | 0x200 |
| | MainTierLevel4 | 0x400 |
| | HighTierLevel4 | 0x800 |
| | MainTierLevel41 | 0x1000 |
| | HighTierLevel41 | 0x2000 |
| | MainTierLevel5 | 0x4000 |
| | HighTierLevel5 | 0x8000 |
| | MainTierLevel51 | 0x10000 |
| | HighTierLevel51 | 0x20000 |
| | MainTierLevel52 | 0x40000 |
| | HighTierLevel52 | 0x80000 |
| | MainTierLevel6 | 0x100000 |
| | HighTierLevel6 | 0x200000 |
| | MainTierLevel61 | 0x400000 |
| | HighTierLevel61 | 0x800000 |
| | MainTierLevel62 | 0x1000000 |
| | HighTierLevel62 | 0x2000000 |
| AV1 | Level2 | 0x1 |
| | Level21 | 0x2 |
| | Level22 | 0x4 |
| | Level23 | 0x8 |
| | Level3 | 0x10 |
| | Level31 | 0x20 |
| | Level32 | 0x40 |
| | Level33 | 0x80 |
| | Level4 | 0x100 |
| | Level41 | 0x200 |
| | Level42 | 0x400 |
| | Level43 | 0x800 |
| | Level5 | 0x1000 |
| | Level51 | 0x2000 |
| | Level52 | 0x4000 |
| | Level53 | 0x8000 |
| | Level6 | 0x10000 |
| | Level61 | 0x20000 |
| | Level62 | 0x40000 |
| | Level63 | 0x80000 |
| | Level7 | 0x100000 |
| | Level71 | 0x200000 |
| | Level72 | 0x400000 |
| | Level73 | 0x800000 |

Profile and level supported by the terminal device are listed in the form of two-tuple. For example, a device A supports the H264 capability: (Baseline, Level51), (Main, Level51), (High, Level51).

In some embodiments, in addition to the decoding capability of the terminal device, the decoding capability response may further include an identifier indicating whether query of the decoding protocol to be queried by the cloud server succeeds, and the protocol version number supported by the terminal device.

In some embodiments, if the query of the decoding protocol to be queried by the cloud server succeeds, the identifier indicating whether query of the decoding protocol to be queried by the cloud server succeeds can be represented by 0. If the query of the decoding protocol to be queried by the cloud server fails, the identifier indicating whether query of the decoding protocol to be queried by the cloud server succeeds can be represented by an error code, for example, 001.

In some embodiments, the protocol version number refers to a minimum protocol version supported by the terminal device, and the protocol may be a decoding protocol.

In some embodiments, the decoding capability of the terminal device includes at least one of the following but is not limited to: a decoding protocol type supported by the terminal device; and Profile, Level and performance supported by the decoding protocol.

In an example 1, a code of the decoding capability response can be implemented as follows:
[codec_ability]; encoding and decoding capability
state=0; the query succeeds, and a status code 0 is returned
version=1.0; terminal device protocol version
codecs=2; support two hardware codecs, and information is in the subsequent [codec1] and [codec2]
[codec1]; first decoder information
type=16; codec is H264
profiles=3; H264 supports three profiles, and information is in the subsequent profile1-profile3
profile1=1, 32768; H264 supports (Baseline, Level51)
profile2=2, 32768; H264 supports (Main, Level51)
profile3=8, 32768; H264 supports (High, Level51)
performances=3; H264 supports three performances, and information is in performance1-performance3
performance1=4, 8, 3; H264 decoding at 720p@60 fps takes 3 ms
performance2=8, 8, 6; H264 decoding at 1080p@60 fps takes 6 ms
performance3=8, 32, 4; H264 decoding at 1080p@120 fps takes 4 ms
[codec2]; second decoder information
type=17; codec is H265
profiles=1; H265 supports one profile, and information is in the subsequent profile1
profile1=1, 65536; H265 supports (Main, MainTierLevel51)
performances=3; H265 supports three performances, and information is in performance1-performance3
performance1=4, 8, 4; H264 decoding at 720p@60 fps takes 4 ms
performance2=8, 8, 8; H264 decoding at 1080p@60 fps takes 8 ms
performance3=8, 32, 6; H264 decoding at 1080p@120 fps takes 6 ms Reference may be made to Table 1 for descriptions of each data structure in the code, which are not described again herein.

In an example 2, if the terminal device only supports a part of the decoding protocol, information about the supported decoding protocol is returned, and a code of the decoding capability response in this case can be implemented as follows:
[codec_ability]; encoding and decoding capability
state=0; the query succeeds, and the status code 0 is returned version=1.0; terminal device protocol version
codecs=1; support one hardware codec, and information is in the subsequent and [codec1]
[codec1]; first decoder information
type=16; codec is H264, enumeration type
profiles=3; H264 supports three profiles, and information is in the subsequent profile1-profile3
profile1=1, 32768; H264 supports (Baseline, Level51)
profile2=2, 32768; H264 supports (Main, Level51)
profile3=8, 32768; H264 supports (High, Level51) performances=3; H264 supports three performances, and information is in performance1-performance3
performance1=4, 8, 3; H264 decoding at 720p@60 fps takes 3 ms
performance2=8, 8, 6; H264 decoding at 1080p@60 fps takes 6 ms
performance3=8, 32, 4; H264 decoding at 1080p@120 fps takes 4 ms Reference may be made to Table 1 for descriptions of each data structure in the code, which are not described again below.

In an example 3, if the terminal device does not support the decoding protocol, codecs=0 is returned, and a code of the decoding capability response in this case can be implemented as follows:
[codec_ability]; encoding and decoding capability
state=0; the query succeeds, and the status code 0 is returned
version=1.0; terminal device protocol version
codecs=0; support 0 hardware codec Reference may be made to Table 1 for descriptions of each data structure in the code, which are not described again herein.

In an example 4, if the decoding capability request to the terminal device fails, an error code is returned, and a code of the decoding capability response in this case can be implemented as follows:
[codec_ability]; encoding and decoding capability
state=−1; the query fails, and a status code −1 is returned
version=0.9; terminal device protocol version Refer to Table 1 for descriptions of each data structure in the code, which are not described again herein.

In some embodiments, for a more complex cloud gaming type, the cloud server selects a higher capability within the decoding capability range of the terminal device. For example, in the example 1, profile3 and performances3 are selected, where the cloud server may select the target decoding configuration according to a mapping relationship between the cloud gaming type the decoding capability of the terminal device, and may further select the target decoding configuration according to another selection rule.

In some embodiments, for a worse network status, the cloud server can select a higher capability within the decoding capability range of the terminal device. For example, in the example 1, profile3 and performances3 are selected, where the cloud server may select the target decoding configuration according to a mapping relationship between the network status and the decoding capability of the terminal device, and may further select the target decoding configuration according to another selection rule.

In some embodiments, the cloud server may select the target decoding configuration according to a mapping relationship among the cloud gaming type, the network status, and the decoding capability of the terminal device, and may further select the target decoding configuration according to another selection rule.

The method for determining the target decoding configuration is not limited herein.

To sum up, according to the technical solutions provided in the embodiments, the terminal device decodes the bitstream of the video stream through the target decoding configuration, to improve the decoding effect.

In some embodiments, the encoded bitstream obtained through encoding may be transmitted to the terminal device after the cloud server implements the encoding of the video stream based on the embodiments of the image encoding above. Correspondingly, the terminal device decodes the received encoded bitstream. Some embodiments further provide an image decoding method, including: A terminal device obtains an encoded bitstream corresponding to a video stream, where the video stream includes a first image frame and a next image frame of the first image frame, and the encoded bitstream includes a first non-IDR frame obtained by encoding the first image frame, and an IDR frame obtained by encoding the next image frame of the first image frame in a case that it is determined according to the first non-IDR frame that a scene switch occurs; and the terminal device decodes the encoded bitstream, to obtain and play the video stream.

Figure 10:
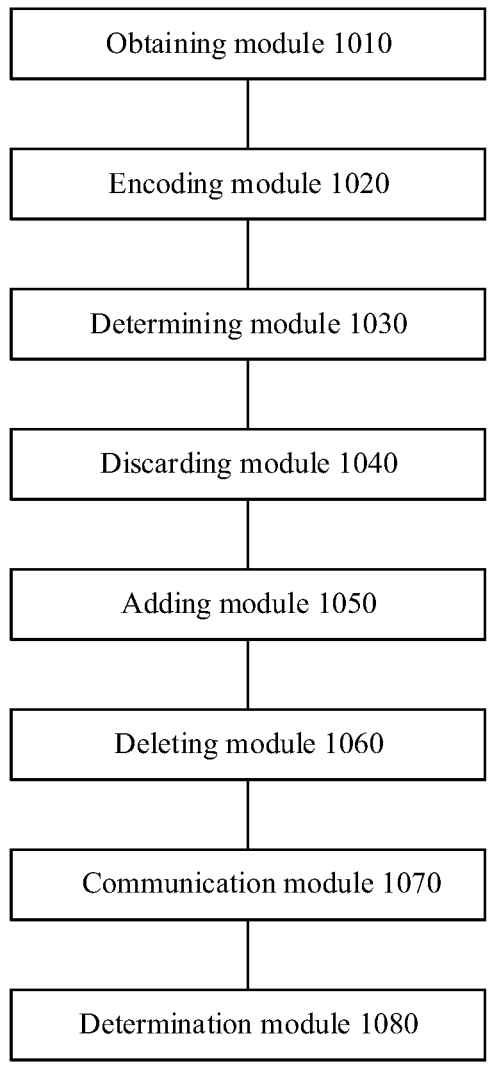
FIG. 10 is a schematic diagram of an image encoding apparatus according to some embodiments.

FIG. 10 is a schematic diagram of an image encoding apparatus according to some embodiments. As shown in FIG. 10, the apparatus includes an obtaining module 1010 and an encoding module 1020, where
  the obtaining module 1010 is configured to obtain a first image frame in a video stream;
  the encoding module 1020 is configured to encode the first image frame into a first non-IDR frame; and
  the encoding module 1020 is further configured to encode a next image frame of the first image frame into an IDR frame in a case that it is determined according to the first non-IDR frame that a scene switch occurs.

In some embodiments, the apparatus further includes a determining module 1030, configured to determine, according to the first non-IDR frame, whether the scene switch occurs.

In some embodiments, the apparatus further includes a discarding module 1040, configured to discard a bitstream corresponding to the first non-IDR frame in a case that it is determined that the scene switch occurs. The encoding module 1020 is further configured to encode a previous image frame of the first image frame into a second non-IDR frame.

In some embodiments, the determining module 1030 is further configured to determine an intra prediction pixel ratio of the first non-IDR frame, and determine, according to the intra prediction pixel ratio of the first non-IDR frame, whether the scene switch occurs.

In some embodiments, the determining module 1030 is further configured to determine, in a case that the intra prediction pixel ratio of the first non-IDR frame is greater than a preset threshold, that the scene switch occurs, and determine, in a case that the intra prediction pixel ratio of the first non-IDR frame is less than or equal to the preset threshold, that the scene switch does not occur.

In some embodiments, the apparatus further includes an adding module 1050 and a deleting module 1060. The adding module 1050 is configured to add the first image frame to a reference frame list after the encoding module 1020 encodes the first image frame into the first non-IDR frame. The deleting module is configured to delete the first image frame from the reference frame list in a case that it is determined that the scene switch occurs.

In some embodiments, the obtaining module 1010 is further configured to obtain a second image frame; and the encoding module 1020 is further configured to encode the second image frame into an IDR frame, where the second image frame is an image frame that is separated from the first image frame by a preset distance, and there is no other IDR frame between the second image frame and the first image frame in the video stream.

In some embodiments, the determining module 1030 is further configured to obtain a preset image frame sequence to which the first image frame belongs before the determining according to the first non-IDR frame whether the scene switch occurs, determine whether there is an image frame that is encoded into an IDR frame based on a scene switch in the preset image frame sequence to which the first image frame belongs. Correspondingly, the determining module 1030 is further configured to determine, according to the first non-IDR frame in a case that there is no image frame that is encoded into an IDR frame based on the scene switch in the preset image frame sequence, whether the scene switch occurs.

In some embodiments, the first image frame is any image frame except an image frame that is the first and an encoded IDR frame in the video stream.

In some embodiments, the apparatus further includes a communication module 1070 and a determination module 1080. The communication module 1070 is configured to transmit a decoding capability request to the terminal device, and receive a decoding capability response from the terminal device, the decoding capability response including a decoding capability of the terminal device. The determination module 1080 is configured to determine a target decoding configuration according to the decoding capability of the terminal device, a cloud gaming type, and a current network status. The communication module 1070 is further configured to transmit the target decoding configuration to the terminal device, so that the terminal device encodes the bitstream of the video stream through the target decoding configuration.

It is to be understood that, the apparatus embodiment and the method embodiment may correspond to each other, and reference may be made to the method embodiment for similar descriptions. The details are not repeated herein to avoid repetition. The apparatus shown in FIG. 10 can implement the image encoding method embodiment. The foregoing descriptions and other operations and/or functions of each module in the apparatus are respectively for implementing the corresponding processes in each image encoding method above. The details are not repeated herein for brevity.

The apparatus in some embodiments is described above from the perspective of functional modules with reference to the accompanying drawings. It is to be understood that the functional modules may be implemented in a hardware form, may be implemented by using instructions in a software form, and may alternatively be implemented by a combination of hardware and a software module. Each operation of the method embodiment in some embodiments can be completed through an integrated logic circuit of hardware in the processor and/or instructions in a software form, and the operations of the method disclosed in some embodiments can be performed and completed by a hardware decoding processor or hardware in the hardware decoding processor combined with a software module. In some embodiments, the software module may be located in a mature storage medium in this field, for example, a random access memory, a flash memory, a read-only memory, a programmable read-only memory, an electrically erasable programmable memory, or a register. The storage medium is located in a memory, and a processor reads information in the memory, and completes the operations in the foregoing method embodiments with the hardware.

Figure 11:
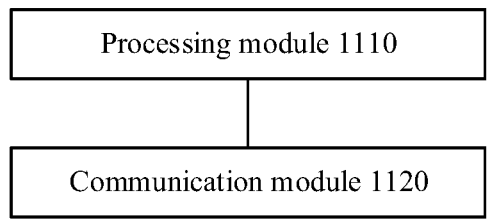
FIG. 11 is a schematic diagram of a real-time communication apparatus according to some embodiments.

FIG. 11 is a schematic diagram of a real-time communication apparatus according to some embodiments. As shown in FIG. 11, the apparatus includes a processing module 1110 and a communication module 1120. The communication module 1120 is configured to obtain user operation information transmitted by the terminal device. The processing module 1110 is configured to generate a video stream in real time according to the user operation information, obtain a first image frame in the video stream, encode the first image frame into a first non-IDR frame, and encode a next image frame of the first image frame into an IDR frame in a case that it is determined according to the first non-IDR frame that a scene switch occurs, to obtain an encoded bitstream corresponding to the next image frame. The communication module 1120 is further configured to transmit the encoded bitstream corresponding to the next image frame to the terminal device.

In some embodiments, the processing module 1110 is further configured to discard a bitstream corresponding to the first non-IDR frame in a case that it is determined that the scene switch occurs, and encode a previous image frame of the first image frame into a second non-IDR frame, to obtain an encoded bitstream corresponding to the previous image frame. The communication module 1120 is further configured to transmit the encoded bitstream corresponding to the previous image frame to the terminal device.

In some embodiments, the processing module 1110 is further configured to determine, according to an intra prediction pixel ratio of the first non-IDR frame, whether the scene switch occurs.

In some embodiments, the processing module 1110 is further configured to determine, in a case that the intra prediction pixel ratio of the first non-IDR frame is greater than a preset threshold, that the scene switch occurs, and determine, in a case that the intra prediction pixel ratio of the first non-IDR frame is less than or equal to the preset threshold, that the scene switch does not occur.

In some embodiments, the processing module 1110 is further configured to obtain a mapping relationship between the user operation information and video data. Correspondingly, the processing module 1110 is further configured to obtain the video data corresponding to the user operation information in real time according to the user operation information and the mapping relationship; and render the video data in real time, to obtain the video stream.

In some embodiments, the processing module 1110 is further configured to add the first image frame to a reference frame list; and delete the first image frame from the reference frame list in a case that it is determined that the scene switch occurs.

In some embodiments, the processing module 1110 is further configured to obtain a second image frame; and encode the second image frame into an IDR frame, where the second image frame is an image frame that is separated from the first image frame by a preset distance, and there is no other IDR frame between the second image frame and the first image frame in the video stream.

In some embodiments, the processing module 1110 is further configured to determine whether there is an image frame that is encoded into an IDR frame based on the scene switch in the preset image frame sequence to which the first image frame belongs. Correspondingly, the processing module 1110 is further configured to determine, according to the first non-IDR frame in a case that there is no image frame that is encoded into an IDR frame based on the scene switch in the preset image frame sequence, whether the scene switch occurs.

In some embodiments, the first image frame is any image frame except an image frame that is the first and an encoded IDR frame in the video stream.

It is to be understood that, as an apparatus embodiment corresponds to a method embodiment, refer to the method embodiment for similar description. The details are not repeated herein to avoid repetition. The apparatus shown in FIG. 11 can implement the real-time communication method embodiment. The foregoing descriptions and other operations and/or functions of each module in the apparatus are respectively for implementing the corresponding processes in each real-time communication method above. The details are not repeated herein for brevity.

The apparatus in some embodiments is described above from the perspective of functional modules with reference to the accompanying drawings. It is to be understood that the functional modules may be implemented in a hardware form, may be implemented by using instructions in a software form, and may alternatively be implemented by a combination of hardware and a software module. Each operation of the method embodiment in some embodiments can be completed through an integrated logic circuit of hardware in the processor and/or instructions in a software form, and the operations of the method disclosed in some embodiments can be performed and completed by a hardware decoding processor or hardware in the hardware decoding processor combined with a software module. In some embodiments, the software module may be located in a mature storage medium in this field, for example, a random access memory, a flash memory, a read-only memory, a programmable read-only memory, an electrically erasable programmable memory, or a register. The storage medium is located in a memory, and a processor reads information in the memory, and completes the operations in the foregoing method embodiments with the hardware.

Figure 12:
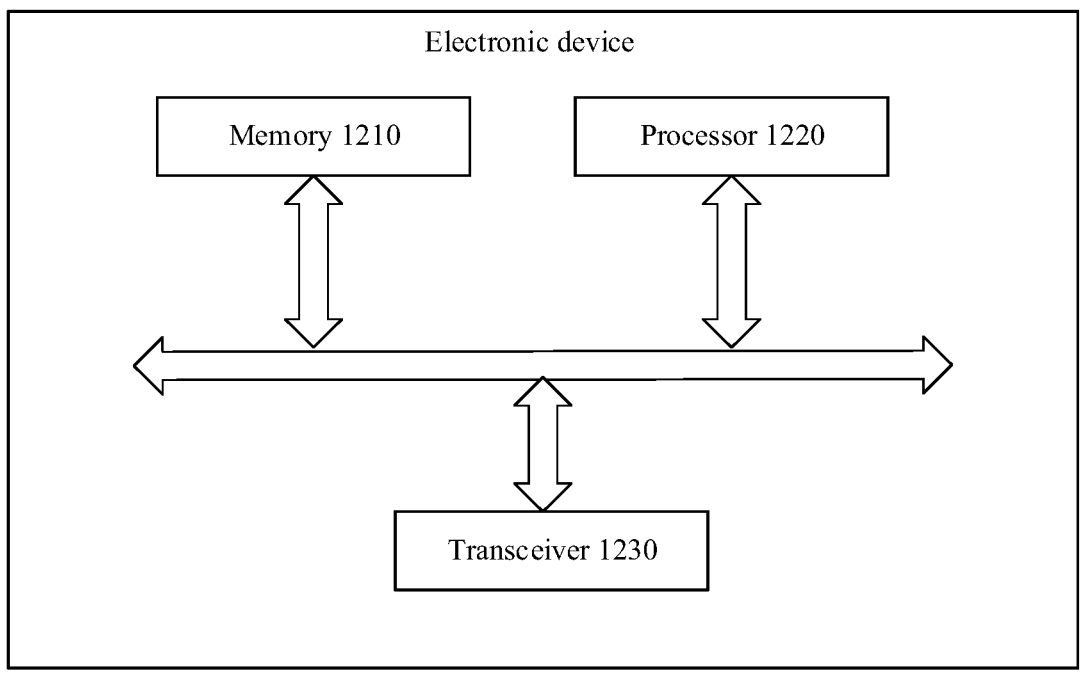
FIG. 12 is a schematic block diagram of an electronic device according to some embodiments.

FIG. 12 is a schematic block diagram of an electronic device according to some embodiments. As shown in FIG. 12, the electronic device may include a memory 1210 and a processor 1220, where the memory 1210 is configured to store a computer program and transmit program code to the processor 1220. In other words, the processor 1220 may call and run the computer program stored in the memory 1210 to implement the method in some embodiments.

For example, the processor 1220 may be configured to implement the method embodiments according to instructions in the computer program.

In some embodiments, the processor 1220 may include but is not limited to:

a general purpose processor, a digital signal processor (DSP), an application specific integrated circuit (ASIC), a field programmable gate array (FPGA) or another programmable logic device, a discrete gate or a transistor logic device, a discrete hardware component, and the like.

In some embodiments, the memory 1210 includes but is not limited to:

a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external high-speed cache. Through illustration but not limitation, RAMs in a plurality forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct rambus random access memory (DR RAM).

In some embodiments, the computer program can be separated into one or more modules. The one or more modules are stored in the memory 1210, and executed by the processor 1220, to complete the method according to some embodiments. The one or more modules may be a series of computer program instruction segments that can complete a specific function, and the instruction segments are used to describe an execution process of the computer program in the electronic device.

As shown in FIG. 12, the electronic device may further include:

a transceiver 1230, where the transceiver 1230 may be connected to the processor 1220 or the memory 1210.

The processor 1220 may control the transceiver 1230 to communicate with another device, in some embodiments, may send information or data to the another device, or receive information or data transmitted by the another device. The transceiver 1230 may include a transmitter and a receiver. The transceiver 1230 may further include an antenna, and there may be one or more antennas.

It is to be understood that the components in the electronic device are connected through a bus system, where the bus system includes a data bus, and further includes a power bus, a control bus, and a status signal bus.

Some embodiments further provide a computer storage medium, storing a computer program. When the computer program is executed by a computer, the computer is enabled to perform the method according to the method embodiments. Some embodiments further provide a computer program product including instructions. When the instructions are executed by a computer, the computer is enabled to perform the method according to the method embodiments.

When software is used for implementation, implementation may be entirely or partially performed in the form of a computer program product. The computer program product includes one or more computer instructions. When the computer program instructions are loaded and executed on the computer, the procedure or functions according to some embodiments are all or partially generated. The computer may be a general purpose computer, a special purpose computer, a computer network, or another programmable device. The computer instructions may be stored in a computer-readable storage medium, or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any usable medium accessible by a computer, or a data storage device, such as a server or a data center, integrating one or more usable media. The available medium may be a magnetic medium (for example a floppy disk, a hard disk, or a magnetic tape), an optical medium (for example a digital video disc (DVD), or a semiconductor medium (for example a solid state drive (SSD)), and so on.

An ordinary person in the art may be aware that, the modules and algorithm operations of each example described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the disclosure.

In some embodiments, it is to be understood that the disclosed system, apparatus, and method may be implemented in other manners. For example, the described apparatus embodiment is merely exemplary. For example, the module division is merely a logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electric, mechanical, or other forms.

The modules described as separate components may or may not be physically separate, and components displayed as modules may or may not be physical modules, may be located in one position, or may be distributed on a plurality of network units. Some or all of the modules may be selected according to actual needs to achieve the objectives of the solutions of the embodiments. For example, functional modules in some embodiments may be integrated into one processing module, or each of the modules may be physically separated, or two or more modules may be integrated into one module.

What is claimed is:

1. An image encoding method, performed by a computer device, comprising:
    obtaining a first image frame in a video stream;
    encoding the first image frame into a first non-instantaneous decoding refresh (non-IDR) frame;
    determining whether the first non-IDR frame indicates that a scene switch occurs; and
    obtaining a preset image frame sequence to which the first image frame belongs;
    determining whether there is an image frame that is encoded into an IDR frame based on the scene switch in the preset image frame sequence;
    determining, according to the first non-IDR frame based on there not being the image frame that is encoded into the IDR frame, whether the scene switch occurs; and
    encoding a next image frame of the first image frame into an instantaneous decoding refresh (IDR) frame based on a determination that the first non-IDR frame indicates that the scene switch occurs.

2. The image encoding method according to claim 1, further comprising:
    discarding, based on the determination, according to the first non-IDR frame, that the scene switch occurs, a bitstream corresponding to the first non-IDR frame and encoding a previous image frame of the first image frame into a second non-IDR frame.

3. The image encoding method according to claim 1, further comprising:
    obtaining an intra prediction pixel ratio of the first non-IDR frame; and
    determining, according to the intra prediction pixel ratio of the first non-IDR frame, whether the scene switch occurs.

4. The image encoding method according to claim 3, wherein the determining, according to the intra prediction pixel ratio of the first non-IDR frame, whether the scene switch occurs, comprises:
    determining, based on the intra prediction pixel ratio of the first non-IDR frame being greater than a preset threshold, that the scene switch occurs; and
    determining, based on the intra prediction pixel ratio of the first non-IDR frame being less than or equal to the preset threshold, that the scene switch does not occur.

5. The image encoding method according to claim 1, wherein after the encoding the first image frame into a first non-IDR frame, the method further comprises:
    adding the first image frame to a reference frame list; and
    deleting the first image frame from the reference frame list based on the determination, according to the first non-IDR frame, that the scene switch occurs.

6. The image encoding method according to claim 1, further comprising:
    obtaining a second image frame in the video stream; and
    encoding the second image frame into an IDR frame, wherein
    the second image frame is separated from the first image frame by a preset distance, and
    there is no other IDR frame between the second image frame and the first image frame.

7. The image encoding method according to claim 1, wherein the first image frame is any image frame except an image frame that is a first encoded image frame in the video stream, and
    the first encoded image frame is an image frame that is determined to be encoded into an IDR frame.

8. The image encoding method according to claim 2, further comprising:
    transmitting a decoding capability request to a terminal device;
    receiving a decoding capability response from the terminal device, the decoding capability response comprising a decoding capability of the terminal device;
    determining a target decoding configuration according to the decoding capability of the terminal device, a cloud gaming type, and a current network status; and
    transmitting the target decoding configuration to the terminal device, so that the terminal device decodes the bitstream of the video stream through the target decoding configuration.

9. An image encoding apparatus, comprising:
    at least one memory configured to store program code; and
    at least one processor configured to read the program code and operate as instructed by the program code, the program code comprising:
    obtaining code configured to cause the at least one processor to obtain a first image frame in a video stream; and
    encoding code configured to cause the at least one processor to encode the first image frame into a first non-instantaneous decoding refresh (non-IDR) frame, determine whether the first non-IDR frame indicates that a scene switch occurs, obtain a preset image frame sequence to which the first image frame belongs, determine whether there is an image frame that is encoded into an IDR frame based on the scene switch in the preset image frame sequence, determine, according to the first non-IDR frame based on there not being the image frame that is encoded into the IDR frame, whether the scene switch occurs, and encode a next image frame of the first image frame into an instantaneous decoding refresh (IDR) frame based on a determination that the first non-IDR frame indicates that the scene switch occurs.

10. The image encoding apparatus according to claim 9, wherein the program code further comprises:
   discarding code configured to cause the at least one processor to discard, based on the determination, according to the first non-IDR frame, that the scene switch occurs, a bitstream corresponding to the first non-IDR frame; and
   the encoding code is further configured to cause the at least one processor to encode a previous image frame of the first image frame into a second non-IDR frame.

11. The image encoding apparatus according to claim 9, wherein the program code further comprises determining code configured to cause the at least one processor to:
   obtain an intra prediction pixel ratio of the first non-IDR frame; and
   determine, according to the intra prediction pixel ratio of the first non-IDR frame, whether the scene switch occurs.

12. The image encoding apparatus according to claim 11, wherein the determining code is further configured to cause the at least one processor to:
   determine, based on the intra prediction pixel ratio of the first non-IDR frame being greater than a preset threshold, that the scene switch occurs; and
   determine, based on the intra prediction pixel ratio of the first non-IDR frame being less than or equal to the preset threshold, that the scene switch does not occur.

13. The image encoding apparatus according to claim 9, wherein the program code further comprises:
   adding code configured to cause the at least one processor to add the first image frame to a reference frame list; and
   deleting code configured to cause the at least one processor to delete the first image frame from the reference frame list based on the determination, according to the first non-IDR frame, that the scene switch occurs.

14. The image encoding apparatus according to claim 9, wherein:
   the obtaining code is further configured to cause the at least one processor to obtain a second image frame in the video stream,
   the encoding code is further configured to cause the at least one processor to encode the second image frame into an IDR frame,
   the second image frame is separated from the first image frame by a preset distance, and
   there is no other IDR frame between the second image frame and the first image frame.

15. The image encoding apparatus according to claim 9, wherein the first image frame is any image frame except an image frame that is a first encoded image frame in the video stream, and
   the first encoded image frame is an image frame that determined to be encoded into an IDR frame.

16. The image encoding apparatus according to claim 10, wherein the program code further comprises:
   communication code configured to cause the at least one processor to: transmit a decoding capability request to a terminal device, and receive a decoding capability response from the terminal device, the decoding capability response comprising a decoding capability of the terminal device;
   determination code configured to cause the at least one processor to determine a target decoding configuration according to the decoding capability of the terminal device, a cloud gaming type, and a current network status; and
   the communication code is further configured to cause the at least one processor to transmit the target decoding configuration to the terminal device, so that the terminal device decodes the bitstream of the video stream through the target decoding configuration.

17. A non-transitory computer-readable storage medium, storing computer code that when executed by at least one processor causes the at least one processor to:
   obtain a first image frame in a video stream;
   encode the first image frame into a first non-instantaneous decoding refresh (non-IDR) frame;
   determine whether the first non-IDR frame indicates that a scene switch occurs; and
   obtain a preset image frame sequence to which the first image frame belongs;
   determine whether there is an image frame that is encoded into an IDR frame based on the scene switch in the preset image frame sequence;
   determine, according to the first non-IDR frame based on there not being the image frame that is encoded into the IDR frame, whether the scene switch occurs; and
   encode a next image frame of the first image frame into an instantaneous decoding refresh (IDR) frame based on a determination that the first non-IDR frame indicates that the scene switch occurs.

18. The non-transitory computer-readable storage medium according to claim 17, wherein the computer code further causes the at least one processor to:
   discard, based on the determination, according to the first non-IDR frame, that the scene switch occurs, a bitstream corresponding to the first non-IDR frame and encode a previous image frame of the first image frame into a second non-IDR frame.

* * * * *